W. D. BROWN.
Hog-Ring Blanks.
No. 158,356.   Patented Jan. 5, 1875.
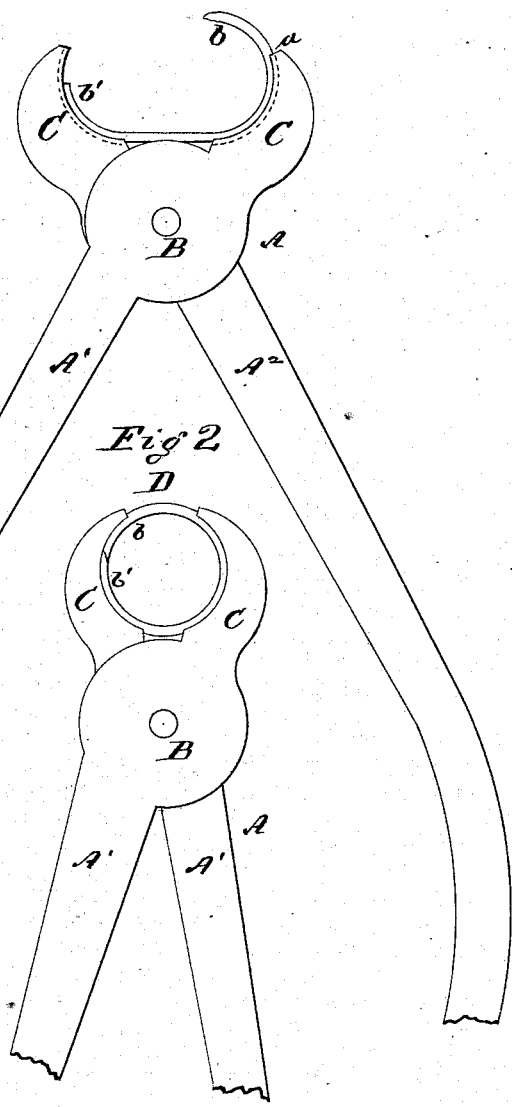
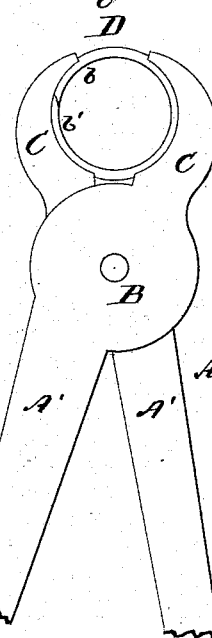
WITNESSES.   INVENTOR
   William D Brown
By Connolly Bros
   Attorneys.

UNITED STATES PATENT OFFICE.

WILLIAM D. BROWN, OF LE ROY, ILLINOIS.

IMPROVEMENT IN HOG-RING BLANKS.

Specification forming part of Letters Patent No. 158,356, dated January 5, 1875; application filed June 24, 1873.

*To all whom it may concern:*

Be it known that I, WILLIAM D. BROWN, of Le Roy, in the county of McLean and State of Illinois, have invented certain new and useful Improvements in Hog Ringer and Rings; and I do hereby declare that the following is a full, clear, and exact description thereof, that will enable others skilled in the art to which it appertains to make and use the same, reference being had to the accompanying drawings and to the letters of reference marked thereon, which form a part of this specification.

In the drawings, Figure 1 is a side view of ringing-tool, with jaws open and ring-blank inserted. Fig. 2 is a side view of ringing-tool with jaws closed upon a ring. Figs. 3 and 4 are views of rings. Fig. 6 is a sectional view of one of the ring-jaws, showing form of groove.

This invention has relation to appliances for ringing hogs and other animals, and consists in the novel construction, as a new article of manufacture, of a snouting ring or blank, made of round wire, and having one or both ends pointed or sharpened, and of such shape that when the wire is passed through the animal's snout and bent to a circular form the ends will meet evenly, leaving the adjoining surface of the ring, on opposite sides of the seam or joint, flush.

Referring to the accompanying drawings, A designates the ringing-tool, consisting of the two levers $A^1$ $A^2$, pivoted together at B, and provided with the curved jaws C, having their inner surfaces segmental and correspondingly grooved. The groove is shown at $a$, and is continuous from point to point of the jaws, and of true concave form. The levers $A^1$ $A^2$ intersect at the pivotal point, and when moved apart separate the curved jaws a considerable distance, as shown in Fig. 1, to adapt them to the reception of the ring-blank D, which lies within the groove. The inner surfaces of the jaws are respectively less than a semicircle in curvature, and hence when brought as close together as necessary for the ringing operation leave between them a true segmental space, the complete circle being broken by the space between the points of the jaws.

The ring-blank is made of round wire, and before being placed in the ringing-tool is bent to a peculiar form, so as to insure the joining of its ends outside the flesh. The ring-blank is therefore curved to a nearly three-quarter oval or elliptic form. The ends are separated by a space in the exact position shown in Fig. 1, so that when the blank is placed between the jaws of the ringing-tool the longer end $b$ shall project beyond the end of its appropriate jaw a sufficient distance to admit of its being passed through the animal's snout and beyond the flesh, while the shorter end $b'$ shall fall back of the end of its jaw, and its contact with the flesh be prevented. The insertion of the wire and the subsequent formation of the ring are accomplished by compressing the jaws toward each other, or rather by moving the jaw containing the end $b$ of the wire, the other jaw being held stationary. It will be seen that it is impossible by the above operation to join the ends of the wire within the flesh, even if the tool be clumsily handled, inasmuch as the end $b$ must invariably pass into the opposite jaw in closing the ring.

My object in providing means for closing the ring outside the flesh is to avoid a very serious defect in the devices hitherto employed in ringing animals, which close the ring inside the flesh, thereby compressing parts of the latter between the ends of the ring, causing it to decay, and so taint the wound as to keep it sore sometimes for months. To cause the ends of the ring to come together evenly, and be perfectly secure against lateral separation, I bevel one end on both sides, and cut or otherwise produce a V-shaped notch in the other end to receive it, as shown in Fig. 3, or correspondingly bevel both ends, as shown in Fig. 4.

Having fully described my invention, what I claim as new, and desire to secure by Letters Patent, is—

The improved ring-blank for snout-rings, made of an approximately three-quarter oval or elliptic form, so that one end may be passed through the animal's snout, and both ends joined outside the flesh, substantially as described.

In testimony that I claim the foregoing, I have hereunto set my hand this 31st day of May, 1873.

WILLIAM D. BROWN.

Witnesses:
  JOHN W. BROWN,
  G. D. CRUMBAUGH.